United States Patent
König et al.

(10) Patent No.: US 6,242,530 B1
(45) Date of Patent: Jun. 5, 2001

(54) STABILIZED BLOCKED ISOCYANATES AND THEIR USE IN POLYURETHANE STOVING LACQUERS

(75) Inventors: Eberhard König, Leverkusen; Karl-Ludwig Noble, Bergisch Gladbach; Theodor Engbert, Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 08/922,818

(22) Filed: Sep. 3, 1997

(30) Foreign Application Priority Data

Sep. 13, 1996 (DE) .................................................. 196 37 334

(51) Int. Cl.[7] .......................... C08K 5/3435; C08K 5/25; C08G 18/80; C09D 175/04
(52) U.S. Cl. ................. 524/718; 252/182.2; 252/182.29; 524/720; 524/728; 528/45; 528/48; 528/49; 560/115; 560/158; 560/330; 560/332; 560/355; 564/34; 564/44; 564/45; 564/60
(58) Field of Search ........................... 252/182.2, 182.29; 524/718, 720, 728; 528/45, 48, 49; 560/115, 158, 330, 332, 355; 564/34, 44, 45, 60

(56) References Cited

U.S. PATENT DOCUMENTS

| | | | |
|---|---|---|---|
| 4,178,279 | * 12/1979 | Uhrhan et al. | 528/60 |
| 4,983,738 | * 1/1991 | Kazmierczak et al. | 546/208 |
| 5,043,372 | * 8/1991 | MacLeay | 524/103 |
| 5,132,387 | * 7/1992 | Baron et al. | 528/49 |
| 5,142,001 | 8/1992 | Yasuda et al. | 525/453 |
| 5,173,560 | * 12/1992 | Gras et al. | 528/45 |
| 5,216,078 | 6/1993 | Cook et al. | 525/124 |
| 5,232,988 | * 8/1993 | Venham et al. | 525/124 |
| 5,379,947 | * 1/1995 | Williams et al. | 241/21 |
| 5,504,178 | * 4/1996 | Shaffer et al. | 528/45 |
| 5,510,443 | * 4/1996 | Shaffer et al. | 528/45 |
| 5,523,377 | 6/1996 | König et al. | 528/45 |

FOREIGN PATENT DOCUMENTS 475003   3/1992   (EP) .

* cited by examiner

*Primary Examiner*—Rabon Sergent
(74) *Attorney, Agent, or Firm*—Joseph C. Gil; Thomas W. Roy

(57) ABSTRACT

The present invention relates to (cyclo)aliphatic polyisocyanates which have a content of blocked and unblocked isocyanate groups (calculated a NCO) of 5 to 25 wt. %, in which at least 95% of the isocyanate groups are present in a form blocked with blocking agents, and which also contain 0.1 to 5.0 wt. % of amines having a structural unit corresponding to formula (I)

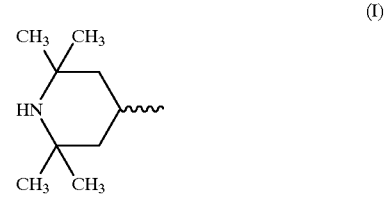

The present invention also relates to the use of the blocked polyisocyanates according to the invention as crosslinking agents for organic polyhydroxyl compounds in 1C-PUR stoving lacquers, especially for automotive clearcoats and coil coating lacquers.

4 Claims, No Drawings

STABILIZED BLOCKED ISOCYANATES AND THEIR USE IN POLYURETHANE STOVING LACQUERS

BACKGROUND OF THE INVENTION

1. Field of the Invention

The present invention relates to new blocked polyisocyanates, which have been stabilized against thermal yellowing, and to their use in one-component polyurethane stoving lacquers.

2. Description of the Prior Art

Blocked polyisocyanates are used in one-component polyurethane (1C-PUR) stoving lacquers, especially for automotive clearcoats and coil coating lacquers. In these applications only a very slight thermal yellowing of the lacquers is allowable, even during accidental or unwanted overstoving of the coating composition.

The blocking agent has an effect on the thermal yellowing of blocked isocyanates. Blocking agents that produce only a very slight thermal yellowing are known and include dimethyl pyrazole and 1,2,4-triazole. Both blocking agents have specific disadvantages however. The first blocking agent is relatively expensive, while the second cannot be used for all applications. For example, when 1,2,4-triazole is used to block the most industrially important lacquer polyisocyanates based on HDI, the resulting products have a high tendency to crystallize, which makes them unsuitable for lacquer applications.

Butanone oxime would also be a particularly suitable blocking agent due to its cost and performance if the thermal yellowing that it produces could be significantly reduced.

Stabilizing agents that significantly reduce the thermal yellowing caused also by butanone oxime are known, e.g., from U.S. Pat. No. 5,216,078 and EP-A 654,490, and the commercially available product Luchem HA-R 100 stabilizer from Elf-Atochem):

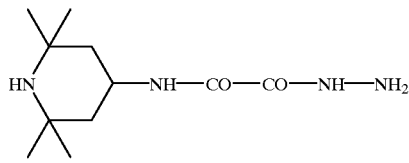

(Molecular Weight 242)

An object of the present invention is to provide butanone oxime-blocked isocyanates which have improved resistance to thermal yellowing and which may be obtained in an economical and technically easy and reliable manner.

This object may be achieved in accordance with the present invention as described hereinafter.

SUMMARY OF THE INVENTION

The present invention relates to (cyclo)aliphatic polyisocyanates which have a content of blocked and unblocked isocyanate groups (calculated as NCO) of 5 to 25 wt. %, in which at least 95% of the isocyanate groups are present in a form blocked with blocking agents, and which also contain the following stabilizing compounds:

A) 0.1 to 5.0 wt. % of amines having a structural unit corresponding to formula (I) which does not contain any hydrazide units

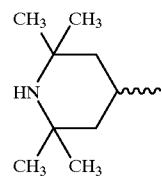

B) optionally 0.1 to 8.0 wt. % of hydrazides having a structural unit correspond to formula (II)

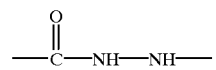

and

C) 0 to 5.0 wt. % of stabilizers other than A) and B).

The present invention also relates to the use of the blocked polyisocyanates according to the invention as crosslinking agents for organic polyhydroxyl compounds in 1C-PUR stoving lacquers, especially for automotive clearcoats and coil coating lacquers.

DETAILED DESCRIPTION OF THE INVENTION

The advantages achieved with the stabilized polyisocyanates according to the invention include, as already indicated in part, a significant improvement in the yellowing resistance under overstoving conditions (for example, 30 minutes at 160° C. or peak metal temperature >254° C.)

heat tempering (for example 120 hours at 120° C., cf. Example 3).

Readily available blocking agents such as butanone oxime or diisopropylamine can be used to obtain the stabilization according to the invention and comparably low thermal yellowing values can be obtained that could otherwise only be obtained with expensive blocking agents, for example, dimethyl pyrazole.

The polyisocyanates used for preparing the blocked polyisocyanates according to the invention are known lacquer polyisocyanates having aliphatically and/or cycloaliphatically bound isocyanate groups and an isocyanate content of 7 to 30 wt. %, preferably 12 to 25 wt. %. Suitable lacquer polyisocyanates include those containing biuret, isocyanurate and/or uretdione groups and are prepared from 1,6-diisocyanatohexane (HDI), 1-isocyanato-3,3,5-trimethyl-5-isocyanato-methyl-cyclohexane (IPDI) and/or 4,4'-diisocyanato-dicyclohexylmethane. Particularly preferred are lacquer polyisocyanates containing isocyanurate groups and based on (i) IPDI, (ii) 4,4'-diisocyanatodicyclohexylmethane, (iii) 1,6-diisocyanatohexane, and mixtures of these polyisocyanates.

Examples of suitable blocking agents that may be used include butanone oxime, diisopropylamine, 1,2,4-triazole, imidazole, malonic ester, acetoacetic ester, dimethyl pyrazole, ε-caprolactam, and mixtures thereof. Butanone oxime is particularly preferred.

The stabilizing agents A) corresponding to formula (I) must contain at least one 2,2,6,6-tetramethylpiperydinyl radical, the so-called HALS (hindered amine light stabilizer) ring. It should be emphasized that in the HALS compounds used according to the invention, the piperidinyl nitrogen is not substituted, and the compounds must therefore contain the following structure:

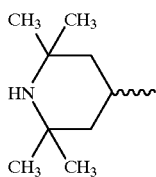

(I)

A particularly preferred stabilizing agent is the HALS compound corresponding to formula (III), which is marketed, inter alia, by Novartis under the name Tinuvin 770 DF which does not contain any hydrazide units.

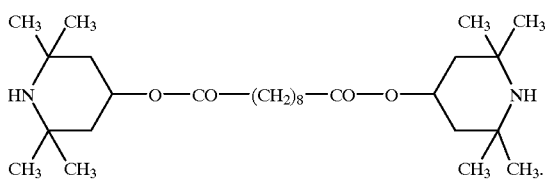

(III)

Suitable stabilizing agents B) corresponding to formula (II) include acid hydrazides, for example acetic acid hydrazide or adipic acid dihydrazide as disclosed in U.S. Pat. No. 5,216,078 (herein incorporated by reference) and also hydrazine adducts formed from hydrazine and cyclic carbonates as disclosed in EP-A 654,490 (U.S. Pat. No. 5,523,377), herein incorporated by reference.

Particularly preferred is the adduct formed from 2 moles of propylene carbonate and 1 mole of hydrazine corresponding to formula (IV):

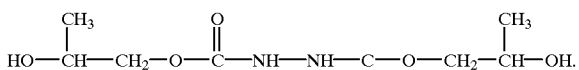

(IV)

(Molecular Weight 236)

Stabilizing agents other than A) and B) that may optionally be used include antioxidants such as 2,6-di-tert.-butyl-4-methylphenol, UV absorbers such as 2-hydroxyphenylbenzotriazoles, and light stabilizers such as HALS compounds substituted at the nitrogen atom, e.g., Tinuvin 292, available from Ciba-Geigy.

The stabilized polyisocyanates according to the invention are prepared at temperature of 20 to 120° C., preferably 70 to 90° C., either in the absence of or in the presence of solvents such as n-butyl acetate, methoxypropyl acetate, toluene and higher aromatic solvent mixtures, for example, those marketed by Exxon-Chemie under the Solvesso trade name.

In accordance with one preferred embodiment for preparing the stabilized polyisocyanates 1.0 NCO equivalent of the isocyanate component is reacted with a portion of the blocking agent, for example 0.8 equivalent, at about 70° C. 1.0 to 1.5%, based on the weight of the blocked crosslinking agent without solvent, of stabilizing component A) and 0.1 to 0.15 OH equivalent of hydrazide stabilizing component B), which is formed from 1 mole of hydrazine and 2 moles of propylene carbonate, are added and the mixture is reacted for several hours at about 85° C. until the calculated NCO content is reached. The remaining 0.05 to 0.1 equivalents of NCO groups are then reacted with the remaining amount of blocking agent until an NCO content can no longer be detected by IR spectroscopy. If desired the product is finally adjusted to the desired viscosity by adding solvent.

The substantially or completely blocked polyisocyanates according to the invention are valuable crosslinking resins for organic polyhydroxyl compounds in the production of stoving lacquers. They can be used instead of the blocked polyisocyanates previously used for this purpose. Suitable polyhydroxyl compounds for use in stoving lacquers are known and additional details regarding the production and use of these stoving lacquers may be obtained from the relevant literature.

A particularly preferred use for the products according to the invention is as crosslinking agents for polyurethane clear stoving lacquers, which may be used as clearcoats in automotive multilayer coatings and as coil coatings for "white goods." Polyester polyols, polyacrylate polyols or mixtures thereof are used as reactants for the blocked polyisocyanates according to the invention.

The invention is further illustrated but is not intended to be limited by the following examples in which all parts and percentages are by weight unless otherwise specified.

EXAMPLES

Example 1 (According to the Invention)

Preparation of a stabilized polyisocyanate according to the invention containing 1.5% of a HALS compound not substituted at the nitrogen atom and 4.4% of a hydrazide compound.

Batch Formulation:

| | | |
|---|---|---|
| 400.0 g | (2.0 g equiv) | of an isocyanurate group-containing lacquer polyisocyanate based on HDI, NCO content of 21% |
| 154.9 g | (1.78 g equiv) | of butanone oxime |
| 26.0 g | (0.22 g equiv) | of the adduct formed from 1 mole of hydrazine hydrate and 2 moles of propylene carbonate, molecular weight 236 |
| 9.0 g | | of a HALS compound according to the invention (Tinuvin 770 DF, available from Ciba-Geigy) |
| 168.4 g | | Methoxypropyl acetate |
| 84.4 g | | Solvesso 100 solvent |
| 842.7 g | (1.78 g equiv) | blocked NCO crosslinking agent blocked NCO content, calculated: 8.8% |

Formulation Procedure:

The above polyisocyanate was mixed with methoxypropyl acetate and the mixture was preheated to about 60° C. The apparatus was flushed with nitrogen. A portion (146 g, 1.68 g. equiv.) of the butanone oxime was added incrementally to the stirred solution. The solution was reacted for about 1 hour at 80° C. until an NCO content of about 1.9% (calculated 1.88%) was reached. The viscous hydrazine adduct was then poured into a casting mould, the total amount of powdered HALS compound (Tinuvin 770 DF) was stirred in and the internal temperature was raised to 90° C. The mixture was reacted for about 10 hours at 90° C. until an NCO content of 0.6% (calculated 0.56%) was reached. The remaining 8.9 g of butanone oxime was added, and after stirring for an additional 30 minutes, no NCO content was detected by IR spectroscopy. The mixture was diluted with Solvesso 100 solvent to provide a 70% colorless clear solution which had a viscosity (23° C.) of 2600 mPa.s. The blocked polyisocyanate solution had an NCO equivalent weight of 477.

Example 2 Comparison

A commercially available polyisocyanate blocked with butanone oxime and based on the isocyanurate-containing lacquer polyisocyanate according to Example 1 was used as comparison, 75% solution in Solvesso 100 solvent. The NCO equivalent weight of the solution (based on the blocked isocyanate groups) was 378. The solution had a viscosity at 23° C. of 3200 mPa.s.

Example 3

The production of coil coating white cover coats and their comparative testing was described.

The polyol component was an oil-free polyester (Alkynol 1655 from Bayer AG) which was present as a 65% solution in solvent naphtha and had an OH equivalent weight of 1000. Binder compositions were prepared at an NCO:OH equivalent ratio of 1:1, which contained the blocked polyisocyanates of Examples 1 and 2 and the oil-free polyester in the following amounts:

Binder compositions:

| | | |
|---|---|---|
| Lacquer 1: | 477 parts by weight of the blocked polyisocyanate according to Example 1 | } 1000 parts } by weight |
| Lacquer 2: | 378 parts by weight of the blocked polyisocyanate according to Example 2 | } of oil-free } polyester |

The following master batch was formulated as pigment paste:

| | |
|---|---|
| 9.5 parts by wt. | oil-free polyester |
| 8.1 parts by wt. | Solvesso 200 S solvent |
| 28.6 parts by wt. | Bayertitan R-KB-4 titanium dioxide pigment |

The pigment paste was dispersed with 2 mm "Siliquarz" beads for about 1 hour in a Skandex mixer. The ground material was then separated from the glass beads using a screen. The following lacquer components were then mixed with the pigment master batch:

| | | |
|---|---|---|
| | 21.1 parts by wt. | ®Alkynol 1665 |
| for lacquer 1 --> | 14.6 parts by wt. | blocked polyisocyanate according to Example 1 |
| for lacquer 2 --> | 11.6 parts by wt. | blocked polyisocyanate according to Example 2 |
| | 0.8 parts by wt. | dibutyltin dilaurate, 10% in Solvesso 200 S solvent |
| | 7.0 parts by wt. | Cellulose acetobutyrate CAB 531-1, available from Eastman |
| | 1.4 parts by wt. | Acrynal 4 F additive (BASF AG), 50% in Solvesso 200 S solvent |

For application purposes the viscosity was adjusted to about 70 sec. DIN 4/23° C. by adding additional amounts of Solvesso 200 S solvent.

Lacquers 1 and 2 were applied with a knife to chromium-plated aluminum sheets (1 mm thick) and immediately stoved on a rotary plate in an Aalborg furnace.

PMT 232° C. 40 sec. at 350° C. furnace temperature
PMT >254° C. 50 sec. at 350° C. furnace temperature The dry film thickness was 20–23 μm.
The following properties were measured:

| Properties | Lacquer 1 (according to the invention) | Lacquer 2 (comparison) |
|---|---|---|
| MEC "double-rubs" | >100 | >100 |
| PMT/° C. | 232 | 232 |
| Gloss 20/60° | 72/89 | 72/89 |
| Microhardness/μm | 3.1 | 5.0 |
| 10 g, 30 sec/recovery | 3.1 | 4.3 |
| Buchholz hardness | 91 | 87 |
| Impact test/lb | 80 | 80 |
| Adhesion | 0 | 0 |
| T-bend test | T1.0 | T1.0 |
| Whiteness | 91.0 | 91.2 |
| Yellow value | −1.9 | −1.9 |
| Whiteness PMT > 254° C. | 84.8 | 74.7 |
| Yellow value PMT > 254° C. | 0.6 | 4.2 |
| Whiteness after 120 hrs at 120° C. | 85.6 | 78.9 |
| Yellow value after 120 hrs at 120° C. | 0.2 | 2.8 |

The property differences at the end of the Table, i.e., under overstoving conditions at a peak metal temperature >254° C., were decisive. At this high object temperature lacquer 1, according to the invention, exhibited its greater stability against thermal yellowing. The whiteness value of 84.8 units, measured according to Berger's method, was about 10 units higher than for lacquer 2. The yellowing was correspondingly lower, (yellow measurement performed according to DIN 6167), with a value of 0.6 compared to 4.2 for lacquer 2.

A property criterion that was important for "white goods", for example stoves and ovens, was heat treatment at 120° C. for 120 hours. Here too the whiteness and yellow values of lacquer 1 were considerably better than for lacquer 2.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A (cyclo)aliphatic polyisocyanate composition which has a content of blocked and unblocked isocyanate groups (calculated as NCO) of 5 to 25 wt %, in which at least 95% of the isocyanate groups are present in a form blocked with a blocking agent comprising a member selected from the group consisting of butanone oxime, diisopropyl amine, 1,2,4-triazole, imidazole, malonic ester, acetoacetic ester, dimethyl pyrazole and ε-caprolactam, and wherein the composition also contains the following stabilizing compounds:

A) 0.1 to 5.0 wt %, based on the weight of the composition, of one or more amines having a structural unit corresponding to formula (I)

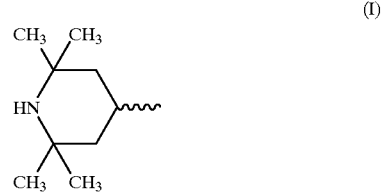

(I)

which does not contain any hydrazide structure,

B) optionally 0.1 to 8.0 wt %, based on the weight of the composition, of one or more hydrazides having a structural unit corresponding to formula (II)

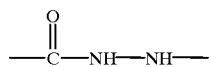
(II)

and

C) 0 to 5.0 wt %, based on the weight of the composition, of one or more stabilizers other than A) and B).

2. The polyisocyanate composition of claim 1 wherein the blocking agent comprises butanone oxime.

3. A one-component polyurethane coating composition containing as binder the polyisocyanate composition of claim 1 and an organic polyhydroxyl compound.

4. A stoving lacquer composition comprising:
(a) a (cyclo)aliphatic polyisocyanate composition which has a, content of blocked and unblocked isocyanate groups (calculated as NCO) of 5 to 25 wt %, in which at least 95% of the isocyanate groups are present in a form blocked with a blocking agent comprising a member selected from the group consisting of butanone oxime, diisopropyl amine, 1,2,4-triazole, imidazole, malonic ester, aetoacetic ester, dimethyl pyrazole and ε-caprolactam, and wherein the composition also contains the following stabilizing compound:
(i) 0.1 to 5 wt %, based on the weight of the polyisocyanate composition, of one or more amines having a structural unit corresponding to formula (I)

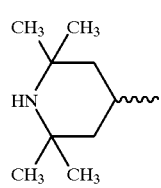
(I)

which does not contain any hydrazide structure; and
(b) a polyhydroxyl compound; wherein the stoving lacquer composition is an uncured solution at room temperature (23° C.).

* * * * *